Patented Feb. 16, 1937

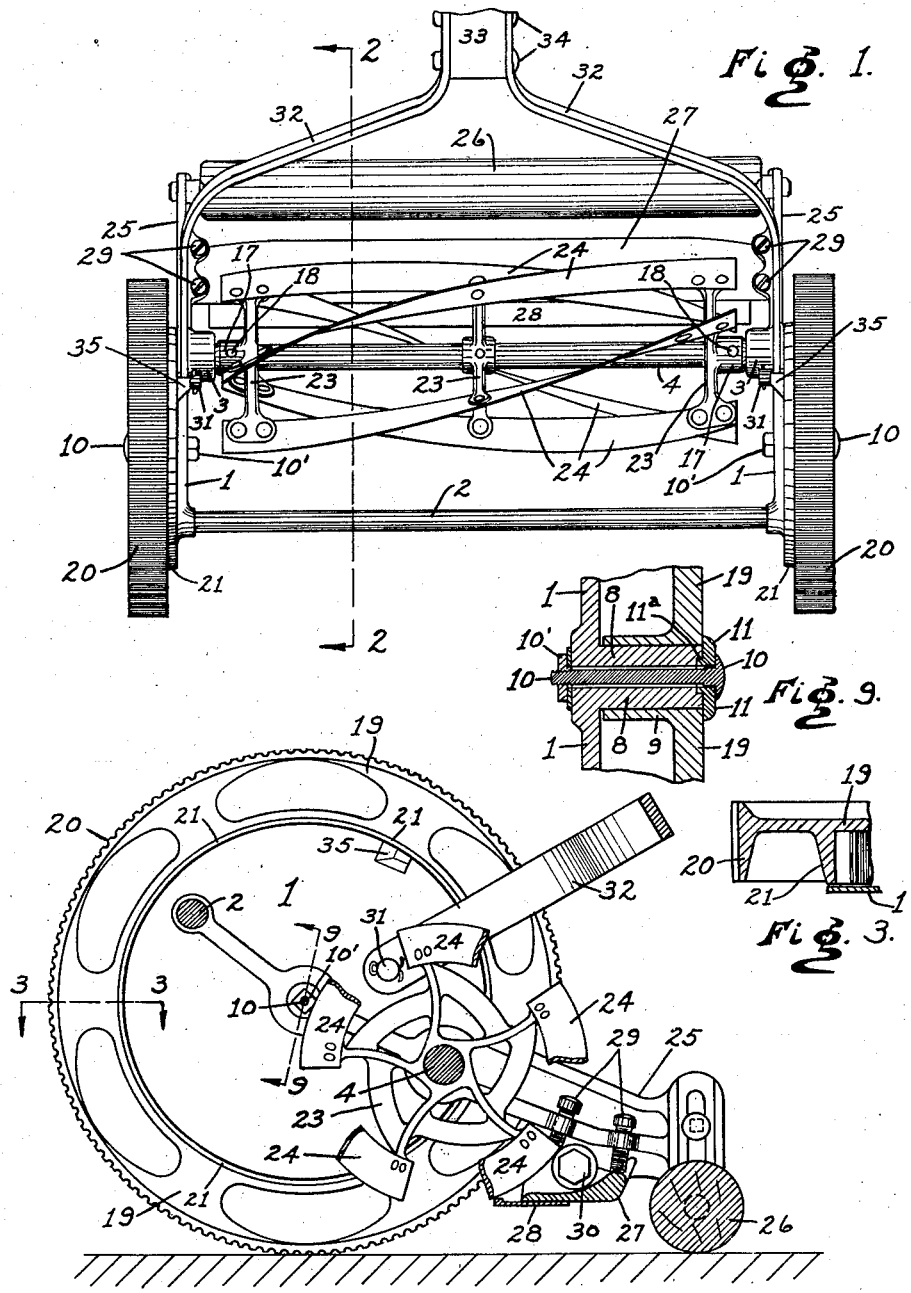

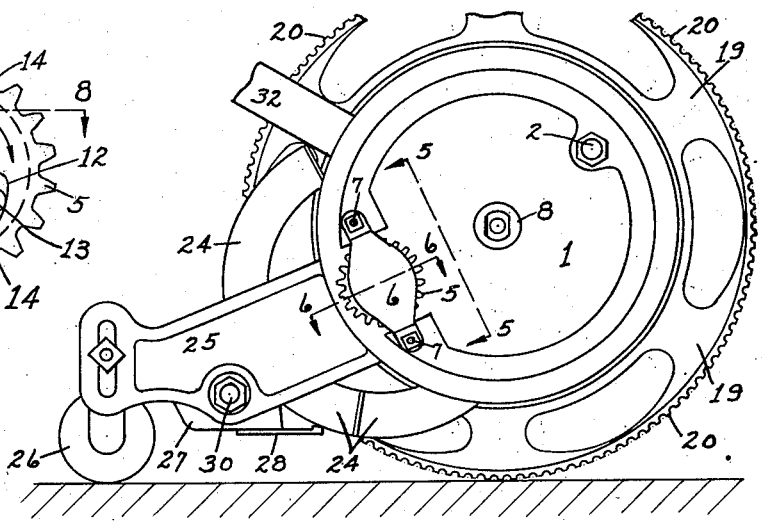
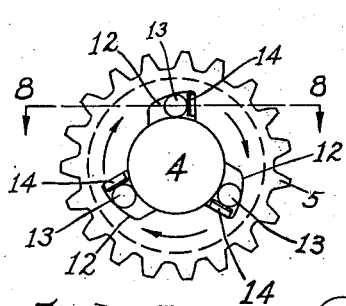
Fig. 7.
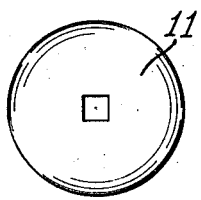
Fig. 11.
Fig. 4.
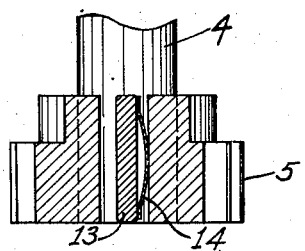
Fig. 8.
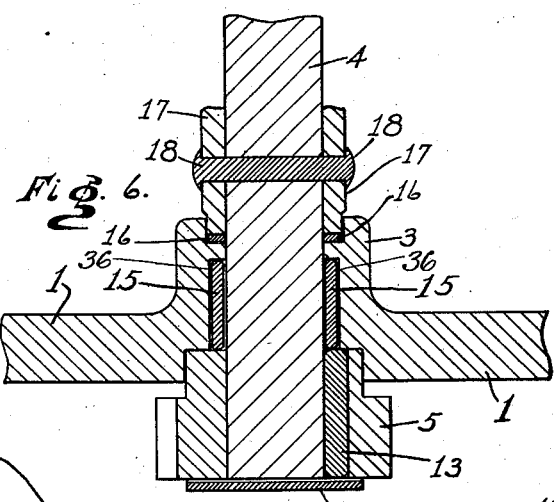
Fig. 6.
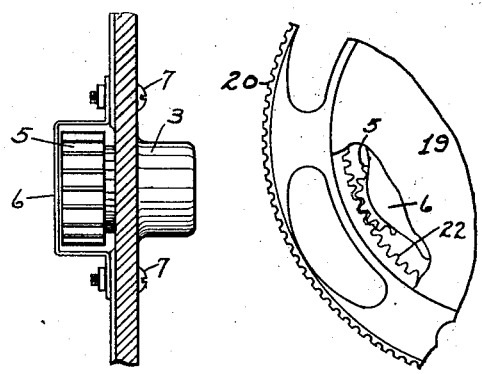
Fig. 5.   Fig. 10.
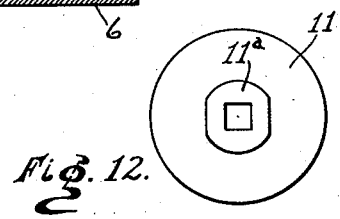
Fig. 12.
Inventors:
GEORGE W. DAVIS and
WALTER C. DAVIS;
Attorney.

2,071,162

UNITED STATES PATENT OFFICE 2,071,162

LAWN MOWER

George W. Davis and Walter C. Davis, Richmond, Ind.

Application January 8, 1934, Serial No. 705,656

1 Claim. (Cl. 56—294)

The object of our present invention, broadly stated, is the production of a lawn mower provided with certain new and useful features of construction and operation, by the employment of which we provide a lawn mower which is particularly easy of operation and dirigibility, positive and immediate in all of its actions, in which practically all noises in its operation are eliminated, with the single exception of that produced by the shearing contact of the spiral blades with the cutter bar blade; the entire elimination of lost motion in all parts of the mower, and especially that of back-lash and end thrust of the reel and other parts. Also the prolongation of the usefulness and efficiency and sturdiness of our lawn mower beyond that heretofore obtained, the same being attained by the construction and new features and refinements which we have incorporated in our construction, and being especially contributed by reason of the elimination of friction and of lateral movements in the bearings, and the attainment of maximum rigidity in the completed product, and all without materially adding to the cost of the finished product.

The especially outstanding features of our new lawn mower reside in providing the same with the principles of free-wheeling, for the attainment of instant engagement when the mower is started to move forwardly, which is accomplished by the employment of new and novel types of clutches for engaging the reel shaft, said clutch being designated as being of the roller type clutch; also in mounting the ends of the reel-shaft with small and slightly flexible roller bearings, and in the employment of other specific features and mechanical refinements which will be made apparent in the course of the following description.

The principles of our invention are implemented by means of the construction shown in the accompanying two sheets of drawings, which form a part of this specification, and in which:—

Figure 1 shows a plan view of our lawn mower in assembled condition, and in which our improvements are incorporated.

Figure 2 is a cross section of our lawn mower as taken on the line 2—2 of Figure 1.

Figure 3 is a detail section as taken on the line 3—3 of Figure 2.

Figure 4 is an end elevation of our mower with one of the ground wheels removed, and showing an introspective view of the interior arrangement and relative location of the various parts.

Figure 5 is a detail section as taken on the line 5—5 of Figure 4, showing a pinion gear and its housing or cover in position.

Figure 6 is a cross section as taken on the line 6—6 of Figure 4, but on an enlarged scale with relation thereto, and especially showing a cross section through the pinion gear, shaft, and roller bearing.

Figure 7 is an end elevation of a pinion gear, and showing the arrangement of the rollers which act as clutches.

Figure 8 is a cross section as taken on the line 8—8 of Figure 7, and showing one of the roller clutches and its retaining spring in section and in operative position.

Figure 9 is a detail cross section taken through one of the hubs, as taken on the line 9—9 of Figure 2.

Figure 10 is a segmental view of a portion of one of the ground wheels, showing one of the pinion gears in mesh with its driving gear.

Figure 11 is an outer face view of one of the wheel caps, and Figure 12 is an inner face view of the same.

Similar indices designate like parts throughout the several views of the drawings.

It is to be understood that in this instance we employ some features which are common to lawn mowers and to these we make no claim per se, but only in combination with certain features which are new with relation to lawn mowers.

It is to be noticed that the several parts at each end of our lawn mower are duplicates of each other, therefore for convenience of description and ease of comprehension, and to avoid prolixity, each two of said duplicate parts will be designated by the same numeral.

Referring now to our construction in detail: Numeral 1 denotes each of the two spaced apart end plates, which are rigidly connected by the rod 2, and together provide the main frame of our mower.

Located near the periphery of each of said plates 1, and integral therewith, and projecting inwardly therefrom, is a tubular housing 3, through which extend the end portions of the reel-shaft 4. Said shaft also extends through and outwardly beyond the respective end plates as shown in Figure 6. Fitting revolvably around the projecting outer portions of each end of the shaft 4 is a floating pinion 5, the reduced inner portion of which is fitted revolvably in a channel formed in the face of each of said plates 1.

One or more channels 12, preferably three as shown in this instance, are formed longitudinally of and in the inner periphery of each of the pinions 5, which channels are each adapted to receive therein a roller 13 which extends practically the full length of its channel as shown in Figure 8. Each of said channels is formed slightly tapering from its flat forward end, from which it extends rearwardly at a slightly angular curve, and near its rear end it turns more distinctly until it finally opens through the inner surface of its pinion at the shaft 4. By reason of the form and dimensions of the channels just described, the forward portion of said channel is such as to permit a roller 13 to be entirely free therein, while the rear portion thereof being of less radial diameter than that of the diameter of the roller 13, and whereby the roller will instantly become wedged between said curved portion and the shaft 4 when the pinion is revolved forwardly, from which it is evident that the direction in which the pinion is rotated determines as to whether the roller will be free or engaged, and of course when it is engaged the shaft 4 will be revolved in such manner as to rotate the blades in shearing contact with the cutter bar. In order to insure the instantaneous engagement of the rollers with the shaft we provide a normally curved flat spring 14 at the forward end of each of said channels, each spring continuously presses against its respective roller and maintains the roller in position to be instantly engaged by the shaft when the pinion starts to rotate in the direction indicated by the arrows in Figure 7, thereby causing the shaft to be rotated as the mower moves forwardly. When the mower stops, the rollers at once disengage from the shaft 4 sufficiently to allow the said shaft and the reel carried thereby, to continue their rotation by means of the centrifugal force applied thereto. In the event that the spring 14 should become broken, or if it be entirely eliminated, it is found that its roller 13 will generally continue to function, as said spring only makes the operation of the roller positive.

Numeral 6 designates end caps, each of which is secured to its respective end plate 1 by a pair of bolts 7, which caps extend over and in close relation to the end of its shaft 4 for the purpose of retaining the pinion 5 in its proper lateral position.

Extending outwardly from the central portion of each of the end plates 1 is a hollow axle 8, and fitting snugly thereon is the hub 9 which extends inwardly from the central portion of the member 19 of the respective ground wheels. The said ground wheels are retained in operative connection with their end plates 1 by means of the respective bolts 10 which extend through the said axle and hub. Said bolts 10 are prevented from turning, after being secured by the means shown in Figures 9, 11 and 12, which means comprises the protuberance 11a, which is formed integral with the disc 11 and having a square aperture therethrough, which aperture continues through the center of the disc 11, the protuberance 11a registers with a like shaped aperture which extends into the axle 8. By reason of the above described arrangement the plate 19 is retained in revolvable connection with the plate 1, and by reason of our particular means of connection they will be prevented from inadvertent separation.

Located outwardly from and concentric with the disc 19, and integral therewith, is the relatively wide rim 20, whose exterior surface is serrated laterally to provde a ground engaging surface, as indicated in Figures 1, 2, 4 and 10.

Also formed integral with the inner face of the member 19 of the ground wheels, is an annular flange member 21, whose horizontal inner face is formed with cut teeth 22, with which the cut gear teeth 5 are continuously in engagement. A portion of the plate 19 is shown as broken away in Figure 10 in order to expose said gears in engagement with each other.

When said parts are assembled as shown in Figure 1, the inner edge of the flange 21 is brought into close relation with its respective end plate 1, and thereby preventing the entrance of extraneous matter therebetween and thereby eliminating the danger of the mechanism becoming clogged.

It is to be noticed that the reel shaft 4 is adapted to operate frictionlessly by reason of the roller bearings 15 which are long as compared with their diameters, in conjunction with which the outer portion of each end thereof is mounted, as shown in Figure 6, in circular race-ways 36 which are formed partly in the inner peripheries of the plate 1, and partly in the inner peripheries of the housing 3. One end of each of said race-ways 36 opens into the respective cavities in which the stem portions of the pinions 5 are located, and whereby the rollers 15 are completely enclosed, and prevented from endwise movements.

Another important feature of our invention resides in the flexible washers 16, through which the shaft 4 extends, and which are located in channels in which the end portions of the hubs 17 are adapted to operate, as shown in Figure 6. The hubs 17 project into the respective channels formed in the outer ends of the bearings 3 into conjunction with the shaft 4, where they contact with their respective flexible washers 16, which also contact with the shaft 4. Said washers are located and normally retained in place by reason of their contact with the bearings 3, the hubs 17, and the shaft 4, all as shown in Fig. 6 and said hubs are secured to the shaft 4 by the members 18.

Rigidly secured to the shaft 4, and concentric therewith, is a plurality of spiders 23, to which are rigidly connected the spiral blades 24, which are of an especially designed curvature.

Extending rearwardly from each of the plates 1, and integral therewith and with the bearing 3, are the arms 25, whose rear ends are supported by the vertically adjustable ground engaging roller 26. Extending between and adjustably secured to the arms 25, is the cutter bar 27, to the under-side of which is secured the cutter blade 28, whose cutting edge projects forwardly beyond the cutter-bar with the cutting edge of said blade adapted to be in shearing contact with the spiral blades 24 which are carried by said reel. Said bar 27 is adjustably connected to the arms 25 at each end thereof by the bolts 30, whereby it may be adjusted by and locked in the desired position by the adjusting screws 29, one of which is located on each side of the bolt 30, substantially as shown in Fig. 2.

Projecting inwardly from each of the plates 1 are the lugs 31, on which are movably pivoted the respective arms 32, which arms extend rearwardly and convergently to where they are connected to the handle 33 by means of the bolts 34, or otherwise. Said handle is limited in its vertical movements by means of the lugs 35, which project inwardly from the end plates 1, and are formed integral therewith.

Some of the especially desirable features realized by the employment of our construction herein set forth, are that we are enabled to produce a lawn mower which is very attractive in appearance; the minimizing or practically eliminating the noises which are usually developed by lawn mowers; providing means whereby our lawn mower can be propelled over the ground with a minimum of power applied thereto; the elimination of back-lash, and without an interval of time between the starting of the mower forwardly and the commencement of the operation of the reel blades in shearing contact with the cutter-bar blade; the ability of the reel to continue freely revolving after the ground wheels have discontinued their operation; the provision of cut gears, which insures a minimum of noise and lost motion; the employment of ground wheels of comparatively large diameter and thereby adding to the ease of operation and permitting the mower to be propelled more slowly with practically the same speed in the operating of the cutting blades; entirely preventing contortion of the frame; and generally increasing the efficiency and durability of the lawn mowers.

In fine, each of the features which we have described in detail materially contribute to the ease of operation, to the elimination of noises, to the production of better performance and results, to the durability of our lawn mower, and many other minor improvements, all of which contribute materially to the attractive appearance and refinements and practicability of our lawn mower.

Having now fully shown and described our new construction in detail, what we claim, and desire to secure by Letters Patent of the United States, is—

In a lawn mower comprising relatively stationary end plates connected by a rod extending therebetween, a ground wheel spaced outwardly from each of said end plates and revolvably connected therewith, a rivet extending through and securing each of said hubs and retaining the respective ground wheels in spaced and rotatable connection with its plate, a flange formed integral with each of said ground wheels and located concentrically with relation to the centers thereof, gear teeth formed around in the inner periphery of each of said flanges, a reel shaft extending between and through both of said end plates, roller bearings carried by each shaft, a pinion revolvably mounted in each projecting end portion of said shaft with the peripherial gears thereof meshing with the respective gear teeth of said flange carried by the respective ground wheels, roller clutches carried by each of said pinions and adapted to make instant engagement with the shaft when the ground wheels start and continue to operate in a forward direction and making instant disengagement from the shaft when the ground wheels start and continue to operate in the reverse direction.

GEORGE W. DAVIS.
WALTER C. DAVIS.